United States Patent

Wu

[11] Patent Number: 6,129,337
[45] Date of Patent: Oct. 10, 2000

[54] VALVE ACTUATING DEVICE

[76] Inventor: Chiou-Mei Wu, No. 81, Lane 355, San-Gang Road, Lung Ching, Taichung, Taiwan

[21] Appl. No.: 09/396,442

[22] Filed: Sep. 15, 1999

[51] Int. Cl.[7] ............................ F16K 31/44; F16K 31/02; F16H 1/16; F16H 1/00
[52] U.S. Cl. ................. 251/248; 251/249.5; 251/129.11; 74/425; 74/625
[58] Field of Search .......................... 251/129.03, 129.11, 251/248, 249.5, 250.5; 74/425, 625

[56] References Cited

U.S. PATENT DOCUMENTS

| | | | |
|---|---|---|---|
| 4,976,168 | 12/1990 | Lotznicker et al. ....................... | 74/625 |
| 5,088,347 | 2/1992 | Wanlass ................................. | 74/625 |
| 5,477,752 | 12/1995 | West et al. ............................. | 74/625 |
| 6,003,837 | 12/1999 | Raymond, Jr. et al. ............ | 251/129.03 |

*Primary Examiner*—Kevin Shaver
*Assistant Examiner*—David A. Bonderer

*Attorney, Agent, or Firm*—Browdy and Neimark

[57] ABSTRACT

A valve actuating device comprising a lower housing seat, a first transmission member, a main shaft, a second transmission member, a fifth transmission member, and an upper housing body; the second transmission member is fastened pivotally at the lower segment thereof with the outer periphery of the ring portion of the first transmission member and is provided on the outer periphery of the midsegment thereof with a worm gear portion engaging a horizontal worm rod, the second transmission member is provided in the inner periphery of the midsegment thereof with a second engagement portion, the third transmission member is fastened pivotally with the main shaft and is provided on the outer periphery of the top segment thereof with a third engagement portion and is further provided at the lower segment thereof with an eccentric shaft portion, the fourth transmission member is fastened pivotally with the eccentric shaft portion and is provided in the outer periphery thereof with a fourth engagement portion which is engaged at the upper segment thereof with the second engagement portion and is further engaged at the lower segment thereof with the first engagement portion.

1 Claim, 2 Drawing Sheets

VALVE ACTUATING DEVICE

BACKGROUND OF THE INVENTION

The present invention relates to a valve, and more particularly to a valve actuating device.

The opening and the closing of a modern valve are brought about electrically. The modern valve is generally provided with a deceleration mechanism comprising a set of worm rod and decelerating gear. Such a deceleration mechanism as mentioned above is defective in design in that it is energy inefficient, and that it is inefficient in the transmission of motion, due to the fact that the worm rod and the gear make use of the sliding friction to attain the transmission.

SUMMARY OF THE INVENTION

The objective of the present invention is to improve the efficiency of the transmission so as to minimize the power waste of the motor.

The present invention may be understood through the following description with reference to the accompanying drawings, in which:

DETAILED DESCRIPTION OF THE EMBODIMENT

Figure 1:
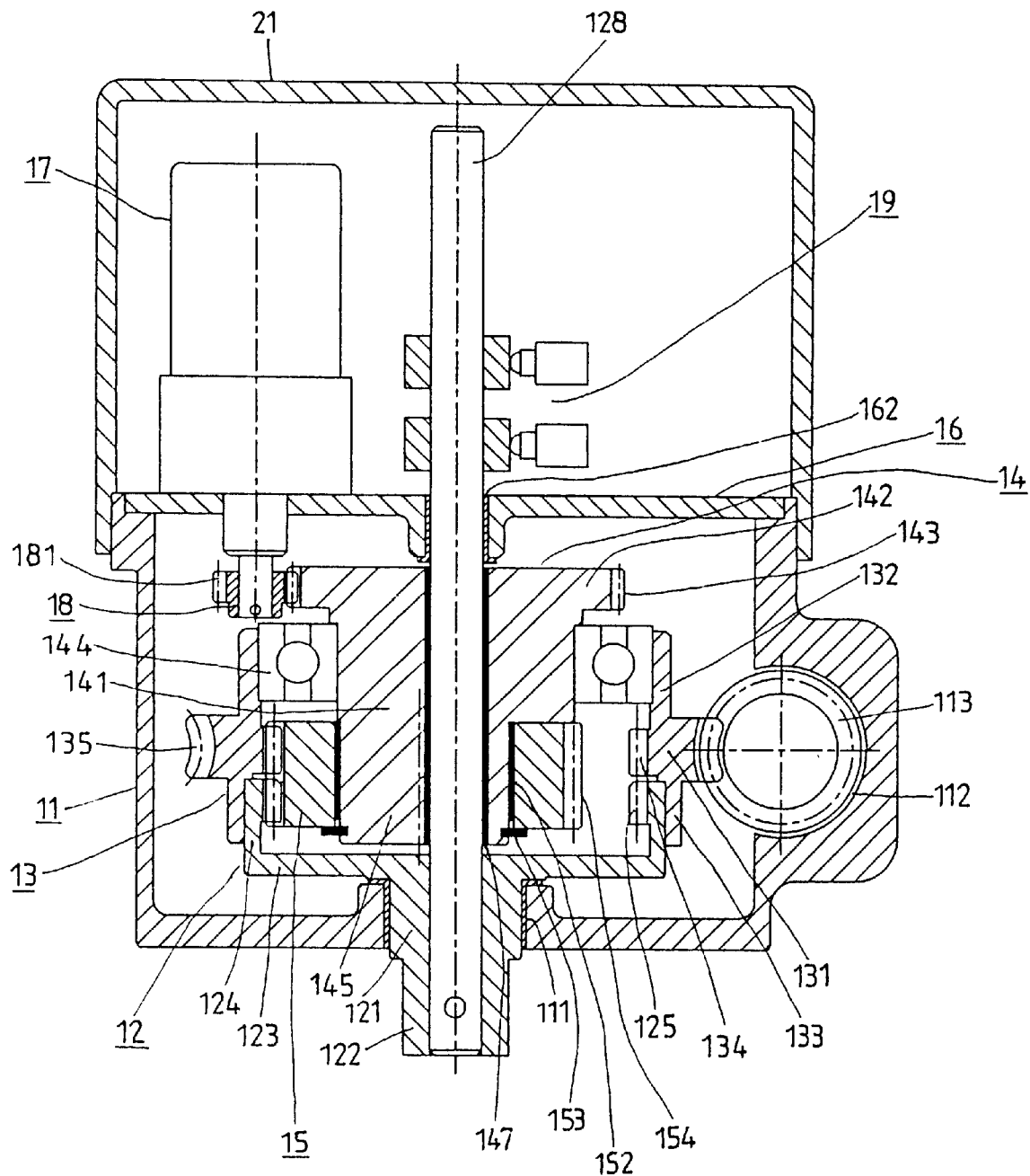
FIG. 1 is an exploded view of the present invention.
Figure 2:
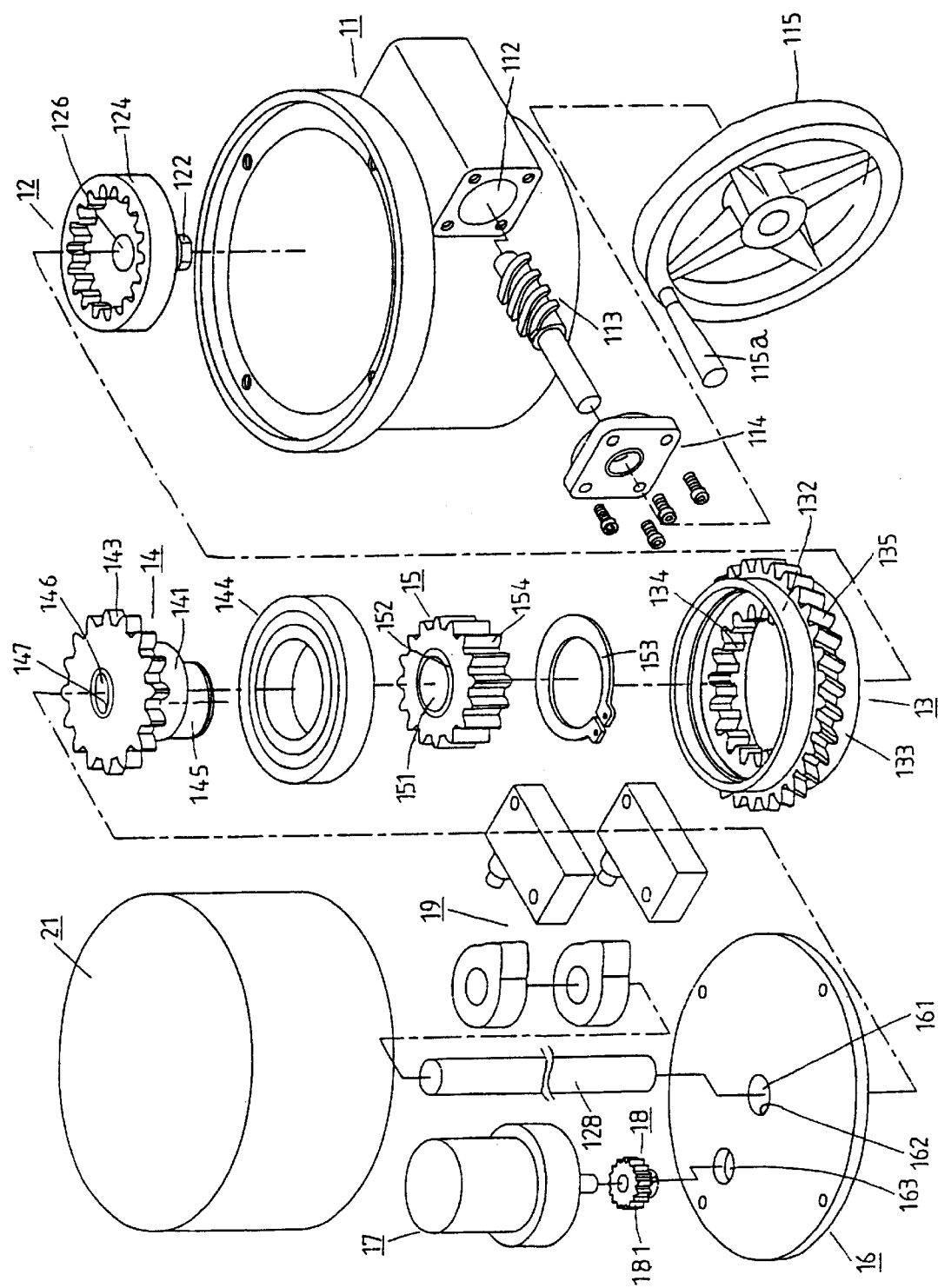
FIG. 2 is a sectional view of the present invention in combination.

As shown in FIGS. 1 and 2, a preferred embodiment according to the present invention includes a lower housing seat 11, a first transmission member 12, a main shaft 128, a second transmission member 13, a third transmission member 14, a fourth transmission member 15, a middle plate 16, a power source 17, a fifth transmission member 18, two detecting members 19, and an upper housing body 21.

The lower housing seat 11 is provided at the bottom thereof with an outlet 111 and is further provided with an open top. The lower housing seat 11 is still further provided with a horizontal receiving cell 112 located in the belly side thereof for receiving a horizontal worm rod 113. The opening of the receiving cell 112 is sealed off by a cover 114.

The first transmission member 12 has a pivot portion 121 provided with a connection portion 122. The pivot portion 121 is further provided with a disk portion 123 extending outwards from the periphery of the upper segment thereof. The disk portion 123 is provided along the outer edge thereof with a ring portion 124 extending on the inner periphery thereof with a first engagement portion 125. The disk portion 123 is provided at the center of the top thereof with an axial hole 126 extending axially and downwards. The pivot portion 121 is provided on the outer periphery thereof with a bushing 127. The pivot portion 121 is fastened pivotally in the outlet 111.

The main shaft 128 is fastened with the first transmission member 12 such that the bottom end of the main shaft 128 is received in the axial hole 126 of the first transmission member 12.

The second transmission member 13 has a middle ring portion 131, an upper ring portion 132 and a lower ring portion 133. The upper ring portion 132 and the lower ring portion 133 extend respectively from the upper side and the lower side of the middle ring portion 131. The lower ring portion 133 is fastened pivotally with the outer periphery of the ring portion 124 of the first transmission member 12. The middle ring portion 131 is provided in the inner periphery thereof with a second engagement portion 131 and in the outer periphery thereof with a worm gear portion 135 which is engaged with the worm rod 113.

The third transmission member 14 has a shaft body portion 141 provided on the upper side thereof with a protruded ring portion 142 extending outwards and having on the outer periphery thereof a third engagement portion 143. The shaft body portion 141 is provided on the midsegment thereof with a bearing 144 and on the lower segment thereof with an eccentric shaft portion 145. The third transmission member 14 is provided with a center axial hole 146 provided therein with a shaft sleeve 147 for fastening pivotally with the main shaft 128. The outer periphery of the bearing 144 is located on the inner periphery of the upper ring portion 132 of the second transmission member 13. The underside of the eccentric shaft portion 145 remains an appropriate distance apart from the top of the disk portion 123 of the first transmission member 12.

The fourth transmission member 15 has a center hole 151 provided therein with a bushing 152. The fourth transmission member 15 is fastened pivotally with the eccentric shaft portion 145 of the third transmission member 14 by means of a C-shaped retaining ring 153. The fourth transmission member 15 is provided in the outer periphery thereof with a fourth engagement portion 154 which has an upper segment engaging the second engagement portion 134 of the second transmission member 13. The fourth engagement portion 134 of the second transmission member 13. The fourth engagement portion 154 has a lower segment engaging the first engagement portion 125 of the first transmission member 12.

The middle plate 16 is fastened with the top end of the lower housing seat 11 and is provided with a center hole 161. The center hole 161 is provided therein with a bushing 162 for engaging pivotally with the middle segment of the main shaft 128. The center hole 161 is further provided with a through hole 163.

The power source 17, which is a motor, is fastened with the middle plate 16 such that the rotary shaft of the power source 17 is received in the through hole 163 of the middle plate 16, and that the rotary shaft of the power source 17 is emerged from the lower end of the through hole 163.

The fifth transmission member 18 is fastened with the rotary shaft of the motor and is provided on the outer periphery thereof with a fifth engagement portion 181 engaging the third engagement portion 143 of the third transmission member 14.

The detecting members 19 are mounted on the upper segments of the main shaft 128 for regulating the start and the stop motions of the motor.

The upper housing body 21 has an open bottom end and is fastened with the top end of the lower housing seat 11.

In operation, the fifth transmission member 18 is actuated by the power source 17 such that the third transmission member 14 is actuated to turn on the main shaft 128. In the meantime, the fourth transmission member 15 is caused by the eccentric shaft portion 145 to engage in a planetary motion. The second transmission member 13 is so confined by the worm rod 113 as to remain stationary. The difference in the number of gears between the first engagement portion 125 and the second engagement portion 134 is about one or two teeth. As a result, when the fourth transmission member 15 is caused to make one turn around the second engagement portion 134 serving as an orbit, the first engagement portion 125 is engaged in a very small differential motion, thereby resulting in a great deceleration ratio and a great output moment to facilitate the opening and the closing of the valve by the connection portion 122 of the first transmission member 12.

In the event of a power interruption, the first transmission member 12 is turned manually by making use of a hand wheel 115 to actuate the worm rod 113, thereby causing the worm gear portion 135 to actuate the fourth transmission member 15. The first engagement portion 125 is therefore actuated by the fourth transmission member 15. The first engagement portion 125 is therefore actuated by the fourth engagement portion 154 so as to actuate the first transmission member 12 to facilitate the opening and the closing of the valve. Since the fourth transmission member 15 is fastened pivotally with the eccentric shaft portion 145, the third transmission member 14 is not actuated. Furthermore, the fifth transmission member 18 and the motor 17 remain stationary when the manual operation of the valve is under way.

To sum up, the present invention has inherent advantages, which are described explicitly hereinafter.

The transmission efficiency of the present invention is greatly improved by virtue of the fact that the fourth transmission member 15 of the present invention is of a planetary gear type, and that the transmission of the present invention is brought about by the rolling contact so as to avert the waste of the horse power of the motor 17 at such time when the transmission is in progress.

The service life span of the present invention is prolonged, thanks to the first, the second and the fourth transmission members 12, 13 and 15, which are engaged with each other in the "manner to minimize the abrasion.

The third transmission member 14 and the fifth transmission member 18 are not actuated in the course of manual operator to turn the hand wheel 115. In addition, the rotary shaft of the motor 17 is not actuated, the service life span of the motor 17 is not actuated, the service life span of the motor 17 is therefore prolonged.

The hand wheel of the prior art valve actuating device of valves is actuated when the prior art valve actuating device is operated electrically. As a result, the prior art valve actuating device is a safety hazard. For example, when the prior art valve actuating device of a valve is triggered remotely from a control room, a person who happens to be near the valve is vulnerable to injury caused accidentally by the handle 115 a, as shown in FIG. 1, of the hand wheel. In addition, the motor 10 is vulnerable to burning out if the hand wheel is so obstructed that the hand wheel is unable to turn when the prior art valve actuating device is triggered remotely. On the contrary, the worm rod 113 and the hand wheel 115 remain stationary when the valve actuating device of the present invention is operated electrically.

While the invention has been described in connection with what is presently considered to be the most practical and preferred embodiments, it is to be understood that the invention is not to be limited to the disclosed embodiments butt on the contrary, is intended to cover various modifications and equivalent arrangements included within the spirit and scope of the appended claims which scope is to be accorded the broadest interpretation so as to encompass all such modifications and equivalent structures.

What is claim is:

1. A valve actuating device comprising:

a lower housing seat provided at a bottom thereof with an outlet and at a top thereof with a middle plate having a center hole corresponding in location to said outlet, said center hole provided with a through hole, said lower housing seat further provided in a belly side thereof with a horizontal worm rod;

a first transmission member having a pivot shaft portion fastened pivotally in said outlet of said lower housing seat, said pivot shaft portion provided on an outer periphery thereof with a disk portion extending outwards therefrom such that said disk portion is located in said lower housing seat, said disk portion provided on an outer edge thereof with a ring portion extending upwards therefrom, said ring portion provided in an inner periphery thereof with a first engagement portion, said pivot shaft portion provided with a center axial hole;

a main shaft having a bottom segment which is received in said axial hole of said first transmission member such that a top segment of said main shaft is put through and beyond said center hole of said middle plate;

a second transmission member of a ring-shaped construction and fastened pivotally at a lower segment thereof with said ring portion of said first transmission member, said second transmission member provided in an outer periphery of a middle segment thereof with a worm gear portion engaging said worm rod, said second transmission member further provided in an inner periphery of a middle segment thereof with a second engagement portion;

a third transmission member provided with a center axial hole and fastened pivotally with said main shaft, said third transmission member fastened pivotally with an inner periphery of an upper segment of said second transmission member fastened pivotally with an inner periphery of an upper segment of said second transmission member, said third transmission member provided on an outer periphery of a top segment thereof with a third engagement portion and at a lower segment thereof with an eccentric shaft portion having a top which remains a distance apart from a top of said disk portion of said first transmission member;

a fourth transmission member fastened pivotally with said with a eccentric shaft portion and provided on an outer periphery thereof fourth engagement portion which has an upper segment engaging said second engagement portion and further has a lower segment engaging said first engagement portion;

a fifth transmission member engaging with said third engagement portion such that said fifth transmission member is driven by a power source; and an upper housing body mounted on said lower housing seat.

* * * * *